US012749239B2

(12) United States Patent
Farm

(10) Patent No.: US 12,749,239 B2
(45) Date of Patent: Sep. 29, 2026

(54) COMPUTING CONTOUR MAP USING TOPOLOGICAL CASES AND CLASSIFIER CASES

(71) Applicant: The Boeing Company, Arlington, VA (US)

(72) Inventor: Brian Paul Farm, South Portland, ME (US)

(73) Assignee: The Boeing Company, Arlington, VA (US)

( * ) Notice: Subject to any disclaimer, the term of this patent is extended or adjusted under 35 U.S.C. 154(b) by 165 days.

(21) Appl. No.: 18/433,187

(22) Filed: Feb. 5, 2024

(65) Prior Publication Data

US 2025/0251254 A1 Aug. 7, 2025

(51) Int. Cl.
*G01C 21/00* (2006.01)
*G06F 18/2413* (2023.01)
(Continued)

(52) U.S. Cl.
CPC ... *G01C 21/3826* (2020.08); *G06F 18/24147* (2023.01); *G06T 11/23* (2026.01);
(Continued)

(58) Field of Classification Search
CPC ... G06T 11/60; G06T 11/203; G06T 2210/64; G06T 1/20; G06T 11/40; G01C 21/3826; G08G 5/50; G08G 5/76
See application file for complete search history.

(56) References Cited

U.S. PATENT DOCUMENTS 6,744,382 B1 * 6/2004 Lapis .................. G01C 23/005
340/963
7,634,353 B2 * 12/2009 Meunier ................ G08G 5/727
701/120
(Continued)

FOREIGN PATENT DOCUMENTS

CN 101739887 B 7/2012
CN 116523189 A 8/2023
(Continued)

OTHER PUBLICATIONS

European Patent Office, Extended European Search Report Issued in Application No. 25155559.5, Jul. 2, 2025, 9 pages.

*Primary Examiner* — Jin Cheng Wang
(74) *Attorney, Agent, or Firm* — Alleman Hall LLP

(57) ABSTRACT

A computing device including one or more processing devices configured to receive raster data including raster data values. The processing devices obtain classifier grid data including classification values selected from among two or more classes. The processing devices generate a contour map by, for each of the classes, generating contour segments connecting pairs of grid locations included in the raster data. Generating the contour segments includes computing respective topological cases of cells of a superimposed grid, which includes cells of the raster data that are associated with respective classification values. Generating the contour segments further includes computing respective classifier cases of the cells. The contour segments are computed based on the topological cases and classifier cases of the cells and are combined into contours. The contour map is computed as a visual representation of the contours. The processing devices output the contour map for display at a display device.

20 Claims, 10 Drawing Sheets

(51) Int. Cl.

| | |
|---|---|
| ***G06T 11/23*** | (2026.01) |
| ***G06T 11/60*** | (2026.01) |
| ***G08G 5/50*** | (2025.01) |
| ***G08G 5/55*** | (2025.01) |
| ***G08G 5/76*** | (2025.01) |

(52) U.S. Cl.

CPC ................ *G06T 11/60* (2013.01); *G08G 5/50* (2025.01); *G08G 5/55* (2025.01); *G08G 5/76* (2025.01); *G06T 2210/64* (2013.01)

(56) References Cited

U.S. PATENT DOCUMENTS

| | | | | |
|---|---|---|---|---|
| 8,477,062 | B1 * | 7/2013 | Kanellis | G01S 13/935 342/26 B |
| 11,704,581 | B1 | 7/2023 | McEntire et al. | |
| 2007/0088492 | A1 * | 4/2007 | Bitar | G08G 5/59 701/4 |
| 2007/0150117 | A1 * | 6/2007 | Bitar | G08G 5/53 701/1 |
| 2007/0276553 | A1 * | 11/2007 | Bitar | G08G 5/74 701/3 |
| 2007/0285283 | A1 * | 12/2007 | Bitar | G08G 5/74 340/963 |
| 2008/0004801 | A1 * | 1/2008 | Bitar | G08G 5/21 701/454 |
| 2008/0174454 | A1 * | 7/2008 | Bitar | G01C 23/00 340/975 |
| 2008/0306680 | A1 * | 12/2008 | Marty | G08G 5/32 701/533 |
| 2010/0052973 | A1 * | 3/2010 | Fabre | G08G 5/51 342/30 |
| 2010/0286954 | A1 * | 11/2010 | Chen | G01D 21/00 702/179 |
| 2013/0179011 | A1 * | 7/2013 | Colby | G05D 1/105 701/16 |
| 2013/0204516 | A1 * | 8/2013 | Fukamachi | G08G 1/167 701/300 |
| 2015/0339930 | A1 * | 11/2015 | McCann | G08G 5/32 701/528 |
| 2017/0243496 | A1 * | 8/2017 | McCann | G08G 5/76 |
| 2022/0012893 | A1 * | 1/2022 | Jafek | G06T 7/136 |
| 2022/0238025 | A1 * | 7/2022 | McCann | G08G 5/59 |
| 2022/0391615 | A1 * | 12/2022 | Machefer | G06V 30/194 |
| 2023/0038850 | A1 * | 2/2023 | Wani | E02B 1/02 |
| 2024/0345289 | A1 * | 10/2024 | Gu | G06F 18/2321 |
| 2024/0362898 | A1 * | 10/2024 | Brumby | G06V 10/82 |
| 2025/0061400 | A1 * | 2/2025 | Williams | G06Q 50/40 |
| 2025/0175006 | A1 * | 5/2025 | Wang | H02J 3/38 |

FOREIGN PATENT DOCUMENTS

| | | | |
|---|---|---|---|
| WO | 2017173417 | A1 | 10/2017 |
| WO | 2020205296 | A1 | 10/2020 |

* cited by examiner

COMPUTING CONTOUR MAP USING TOPOLOGICAL CASES AND CLASSIFIER CASES

FIELD

This application is related to the computation of contour maps.

BACKGROUND

Contour maps are frequently used in user interfaces to display geographic data and weather data. In a contour map, regions are displayed in a manner that distinguishes between different ranges of a numerical quantity. The contour lines included in a contour map indicate locations that have the same value of that numerical quantity, at one or more boundaries between the ranges. The contour map accordingly buckets the values of the numerical quantity at different locations on the map into regions that can be easier for a user to identify and distinguish. One example application of contour maps is for display of weather or terrain information for pilots and ground personnel to view when planning, directing, and piloting aircraft along aircraft routes.

SUMMARY

According to one aspect of the present disclosure, a computing device is provided, including one or more processing devices configured to receive raster data including a plurality of raster data values. The one or more processing devices are further configured to obtain classifier grid data including a plurality of classification values selected from among two or more classes. The one or more processing devices are further configured to generate a contour map at least in part by, for each of the classes, generating a set of contour segments connecting respective pairs of grid locations included in the raster data. Generating the set of contour segments includes computing respective topological cases of a plurality of cells of a superimposed grid. The superimposed grid includes a plurality of cells of the raster data that are associated with respective classification values included in the classifier grid data. Generating the set of contour segments further includes computing respective classifier cases of the cells of the superimposed grid. Generating the set of contour segments further includes computing the contour segments based at least in part on the topological cases and classifier cases of the cells. Generating the contour map further includes combining the contour segments into a plurality of contours. Generating the contour map further includes computing the contour map as a visual representation of the plurality of contours. The one or more processing devices are further configured to output the contour map for display at a display device.

DETAILED DESCRIPTION

In some contour maps, multiple types of data are displayed together. The numerical values that are bucketed into contours in such contour maps can be raster (gridded) data. For example, the values included in the raster data can correspond to pixels in an image. Classification data can be represented in the contour map in addition to the raster data. The classification data includes discrete values that are also associated with locations on the map. For example, in a weather map, the raster data can indicate precipitation intensity and the classification data can indicate precipitation type. When raster data and classification data are displayed together in a contour map, the areas delineated by the contour lines are further divided to indicate the different classification values. Thus, the contour map shows classified contours.

In one previous approach to generating contour maps that also show classification data, the raster data is masked by overlaying the classification data. This masking generates multiple copies of the grid of raster data that correspond to the different classification values. A contouring algorithm is then run separately on each of the masked raster data sets. However, this approach frequently produces gaps between contours that correspond to different classification values. In addition, this approach can produce contour "ramps" where different classification values meet within a single contour level. The masking approach accordingly tends to produce contour maps that inaccurately represent the underlying data.

In another previous approach, contours are generated separately for the raster data values and for the classification values. Polygon clipping is then performed to clip the raster data contours based on the classification values. Unlike the raster grid masking approach, the polygon clipping approach generates accurate contours. However, the polygon clipping approach is computationally inefficient, since it includes a search for intersecting line segments that has a time complexity of $\mathcal{O}(N^2)$.

Figure 1:
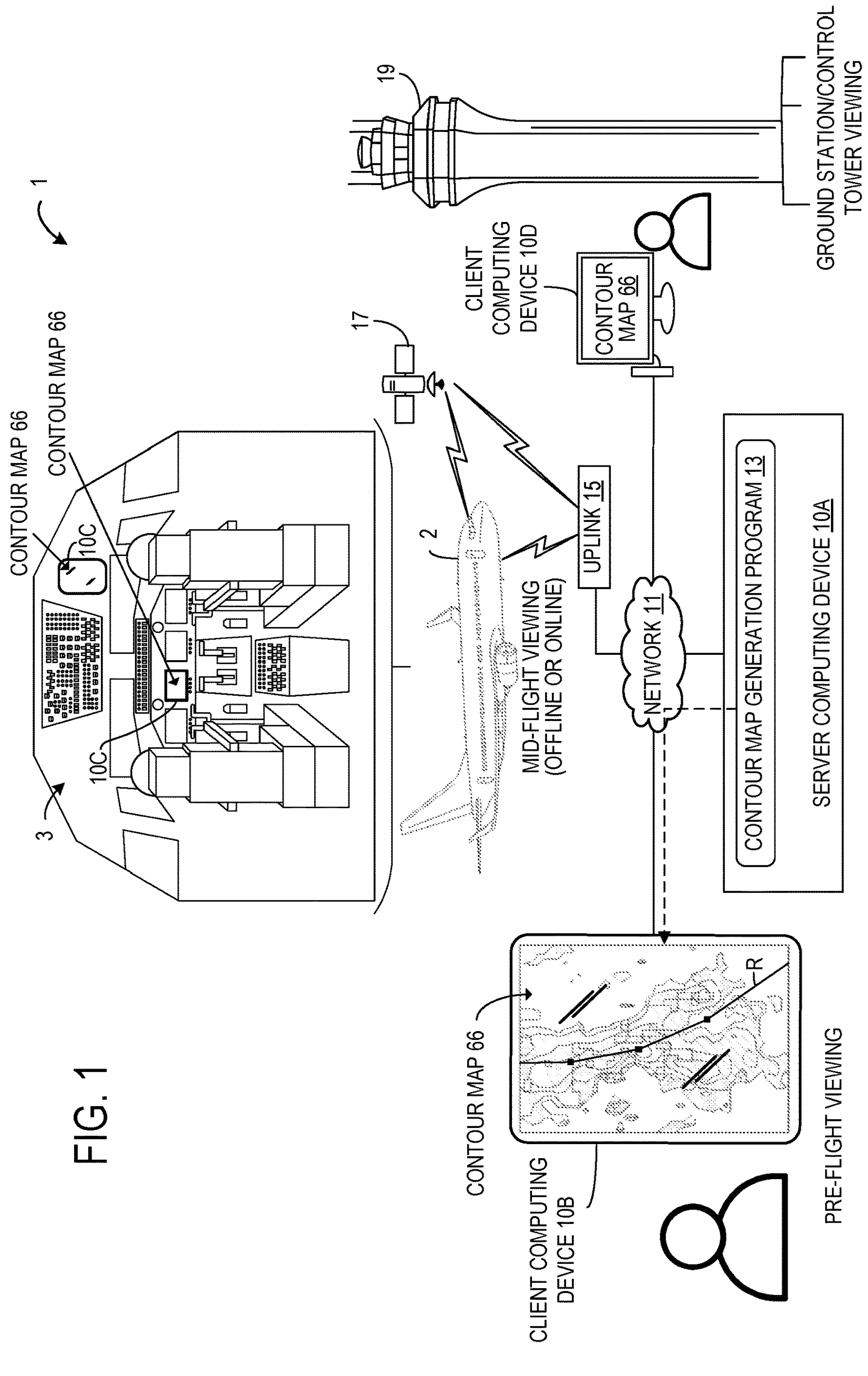
FIG. 1 schematically shows an example air travel setting in which a contour map is generated, according to one example embodiment.

FIG. 1 schematically shows an example air travel setting 1 in which a contour map 66 is generated. In the example of FIG. 1, the contour map 66 is generated at a server computing device 10A that is configured to execute a contour map generation program 13. Subsequently to generating the contour map 66, the server computing device 10A is configured to transmit the contour map 66 over a network 11 to one or more client computing devices 10B that are configured to display the contour map 66 to one or more respective users.

In the example air travel setting of FIG. 1, the contour map 66 can be presented for pre-flight viewing. For example, a client computing device 10B, which can be a mobile computing device such as tablet computing device or smartphone, can display the contour map 66 to a pilot or other personnel to show current or forecasted weather conditions in an area through which an aircraft 2 is scheduled to travel along a planned route R.

The contour map 66 can additionally or alternatively be presented for mid-flight viewing at the aircraft 2. In the example of FIG. 1, the contour map 66 is displayed on one or more display devices of an onboard computing device 10C located in a cockpit 3 of the aircraft 2. The onboard computing device 10C can be a mobile computing device such as a tablet computing device removably mounted in the cockpit (i.e., the same device as client computing device 10A brought onboard by a pilot), or computing device with a display integrated in the flight deck, as shown. This mid-flight viewing can be performed in an offline or online manner. In some examples in which online mid-flight viewing is performed, the contour map 66 can be updated during the flight via network communication between the aircraft and the server computing device 10A over an uplink 15 connected to the network 11. In some examples, the uplink 15 directly communicates with the onboard computing device 10C included in the aircraft 2, while in other examples, the uplink 15 communicates with the aircraft 2 via a satellite 17. In other examples, rather than receiving contour map update data from the server computing device 10A mid-flight, the contour map 66 displayed at the aircraft 2 can be updated locally mid-flight using weather data that has been pre-loaded onto the onboard computing device 10C, received via the network 11, or collected from one or more sensors included in the aircraft 2.

The contour map 66 can additionally or alternatively be displayed to personnel located at a ground station or control tower. For example, a client computing device 10D located in an air traffic control tower 19 can be configured to receive the contour map 66 and display the contour map 66 to an air traffic controller.

Although the example of FIG. 1 shows a contour map 66 that is used in an air travel setting 1, the techniques discussed herein can additionally or alternatively be used in other settings and fields. It will be appreciated that in the example of FIG. 1 the contour map generation program can be executed either at the server computing device 10A, or at the client computing devices 10B, 10C, and 10D. Either at the server or clients, the issues discussed above with inaccuracies and computational inefficiencies of prior techniques are present, but these issues are especially compounded on mobile computing devices such as a tablet computing device, which generally have decreased processing power and lower capacity memory than a server computing device.

Figure 2:
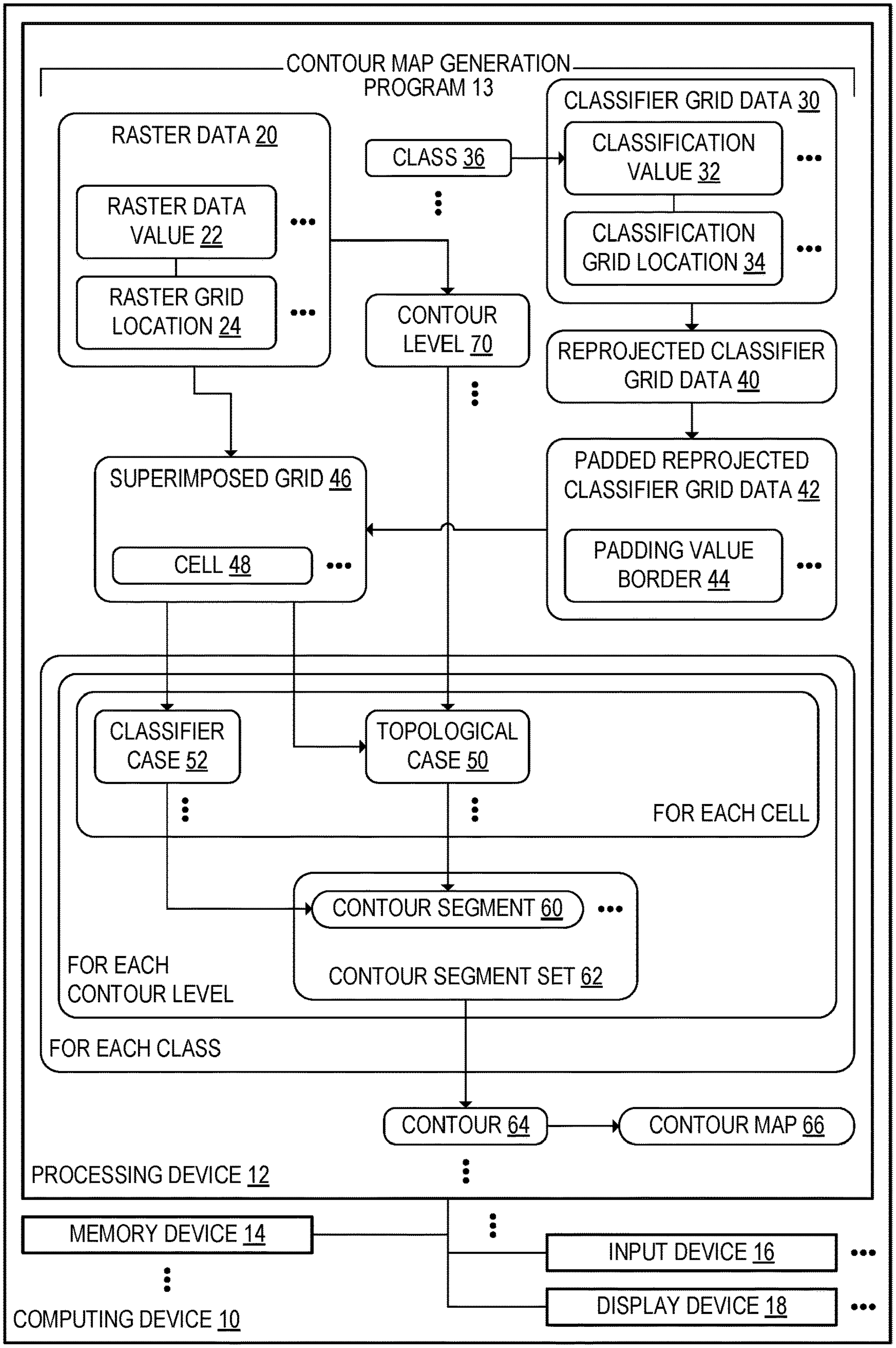
FIG. 2 schematically shows a computing device including one or more processing devices at which a contour map is computed, according to the example of FIG. 1.

In order to address the shortcomings of the existing techniques for generating contour maps with classification values, the following devices and methods are provided. FIG. 2 schematically shows a computing device 10 including one or more processing devices 12. Computing device 10 can take several forms, including server computing device 10A and client computing devices 10B, 10C, and 10D described above. The one or more processing devices 12 included in the computing device 10 are configured to execute the contour map generation program 13, as discussed in further detail below. The one or more processing devices 12 can, for example, include one or more central processing units (CPUs), graphics processing units (GPUs), other hardware accelerators, and/or other types of processing devices. The computing device 10 shown in FIG. 2 further includes one or more memory devices 14, which can, for example, include one or more volatile memory devices and one or more non-volatile storage devices. In some examples, as shown in FIG. 2, the computing device 10 further includes one or more user input devices 16 and one or more display devices 18. Other types of output devices are also included in the computing device 10 in some examples. The computing device 10 can be instantiated in a single physical computing device or distributed across multiple physical computing devices. In some examples, the computing processes discussed below are divided between a client computing device and one or more server computing devices.

The one or more processing devices 12, as shown in FIG. 2, are configured to receive raster data 20 including a plurality of raster data values 22. For example, the raster data values 22 can be pixel values of an image. The raster data values 22 are associated with respective raster grid locations 24, which can be expressed as coordinate pairs.

The one or more processing devices 12 are further configured to obtain classifier grid data 30. The classifier grid data 30 includes a plurality of classification values 32 selected from among two or more classes 36. The classification values 32 are associated with respective classification grid locations 34, which, for example, can be expressed as coordinate pairs over the same grid used for the raster data 20.

The one or more processing devices 12 are further configured to generate a contour map 66 at which the raster data 20 and the classifier grid data 30 are depicted. The process by which the one or more processing devices 12 compute the contour map 66 is discussed in further detail below. The one or more processing devices 12 are further configured to output the contour map 66 for display at a display device 18. In some examples, the display device 18 at which the contour map 66 is displayed is located at a client computing device, whereas the contour map 66 is computed at a server computing device.

Figure 3:
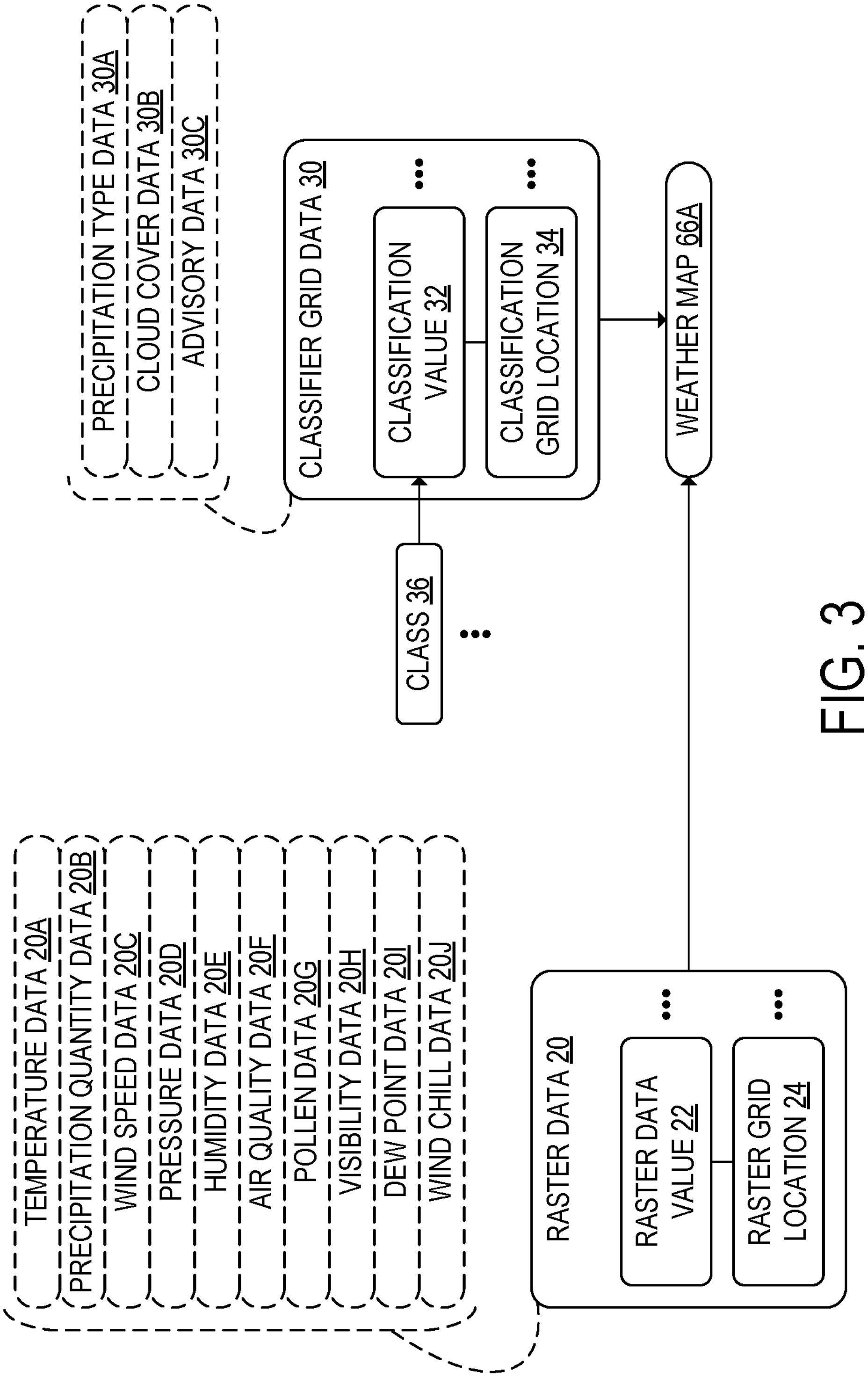
FIG. 3 schematically shows example types of raster data and classifier grid data that can be used to compute the contour map in an example in which the contour map is a weather map, according to the example of FIG. 2.

FIG. 3 shows example types of raster data 20 and classifier grid data 30 that can be used in examples in which the contour map 66 is a weather map 66A. As shown in the example of FIG. 3, the raster data 20 can be temperature data 20A, precipitation quantity data 20B, wind speed data 20C, pressure data 20D, humidity data 20E, air quality data 20F, pollen data 20G, visibility data 20H, dew point data 20I, or wind chill data 20J. Other types of raster data 20 can be used to generate the weather map 66A in other examples. In the example of FIG. 3, the classifier grid data 30 is precipitation type data 30A, cloud cover data 30B, or advisory data 30C. Other types of classifier grid data 30 can be used in other examples.

In some examples, the contour map 66 can be some type of map other than a weather map. For example, the raster data 20 used to generate the contour map 66 can indicate elevation data. In such examples, the classifier grid data 30 can indicate classification values 32 in classes 36 such as land use type.

Returning to the example of FIG. 2, when computing the contour map 66, the one or more processing devices 12 are configured to generate a set of contour segments 60 for each of the classes 36 indicated in the classifier grid data 30. The contour segments 60 are included in a contour segment set 62 and are line segments that define the contours 64 of the contour map 66. The contour segments 60 connect respective pairs of the raster grid locations 24 included in the raster data 20. Although the points connected by the contour segments 60 are located within the spatial extent of the grid in which the raster data values 22 are located, the points connected by the contour segments 60 can, in some examples, be located at intermediate positions that do not correspond to exact locations of the raster data values 22. As shown in the example of FIG. 2, the one or more processing devices 12 are configured to compute a plurality of contour levels 70 corresponding to buckets of the raster data values 22. The one or more processing devices 12 are further configured to compute respective contour segment sets 62 for each of the contour levels 70.

As a preliminary stage to the computation of the contour segments 60, the one or more processing devices 12 are configured to compute reprojected classifier grid data 40. To compute the reprojected classifier grid data 40, the one or more processing devices 12 are configured to sample interpolated values of the classifier grid data 40 at locations that are offset from the classification grid locations 34 by half a pixel horizontally and half a pixel vertically. The resulting sampled classifier grid has one less row and one less column than the grid in which the classifier grid data 40 is arranged.

The one or more processing devices 12 are further configured to compute padded reprojected classifier grid data 42 from the reprojected classifier grid data 40. The padded reprojected classifier grid data 42 is computed by adding a padding value border 44 around the outside of the reprojected classifier grid data 40. The padding value border 44 is a one-pixel-thick border of padding classification values that are different from any of the classification values 32 included in the classifier grid data 30. Thus, the padding classification values are distinguishable from the classification values 32.

The one or more processing devices 12 are further configured to compute a superimposed grid 46. The superimposed grid 46 includes a plurality of cells 48 of the raster data 20 that are associated with respective classification values 32 included in the classifier grid data 30. The superimposed grid 46 is computed by superimposing the padded reprojected classifier grid data 42 and the raster data 20.

Figure 4:
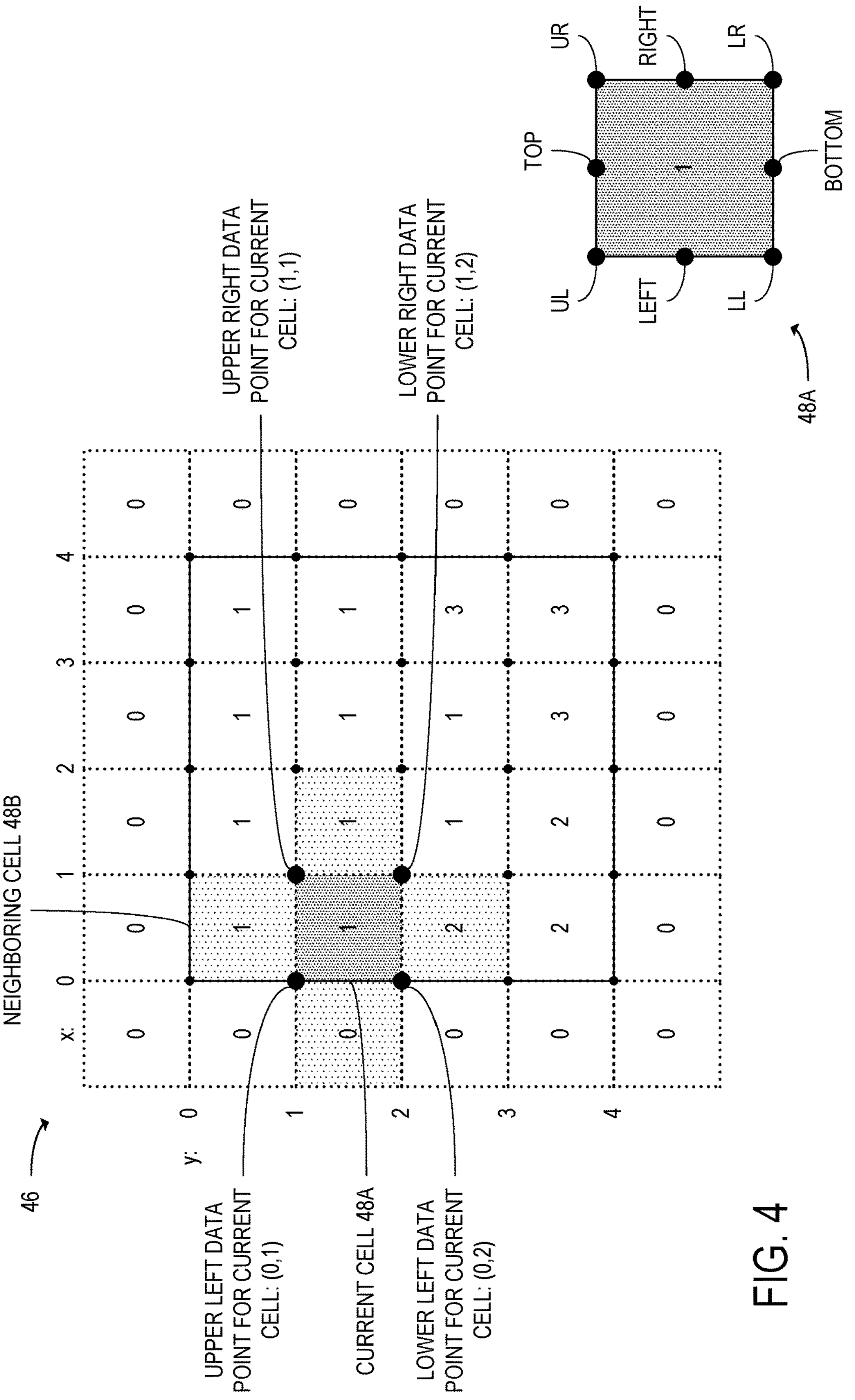
FIG. 4 schematically shows an example superimposed grid of raster data and classifier grid data, according to the example of FIG. 2.

An example superimposed grid 46 is shown in FIG. 4. The raster data values 22 are located at integer values of x and y coordinates, whereas the classification values included in the padded reprojected classifier grid data 42 are located at values of the x and y coordinates that are offset from integer values by ½. Accordingly, the raster data values 22 have raster grid locations 24 that correspond to the corners of the cells 48, and the classification values 32 are located at the centers of the cells 48. In the example of FIG. 4, the classification values 32 are each equal to 0, 1, 2, or 3, where 0 is the padding classification value.

As discussed in further detail below, the one or more processing devices 12 are configured to iterate over the plurality of cells 48 when the contour segments 60 are computed. In the example of FIG. 4, a current cell 48A is highlighted, along with its neighboring cells 48B. A global coordinate system is defined for the superimposed grid 46. In this global coordinate system, the example current cell 48A shown in FIG. 4 has an upper left corner at the x and y coordinates (0, 1), an upper right corner at the coordinates (1, 1), a lower left corner at the coordinates (0, 2), and a lower right corner at the coordinates (1, 2). The current cell 48A has a corresponding classification value of 1. The neighboring cells 48B border the current cell 48A along its upper, left, right, and lower edges, respectively.

Figure 5:
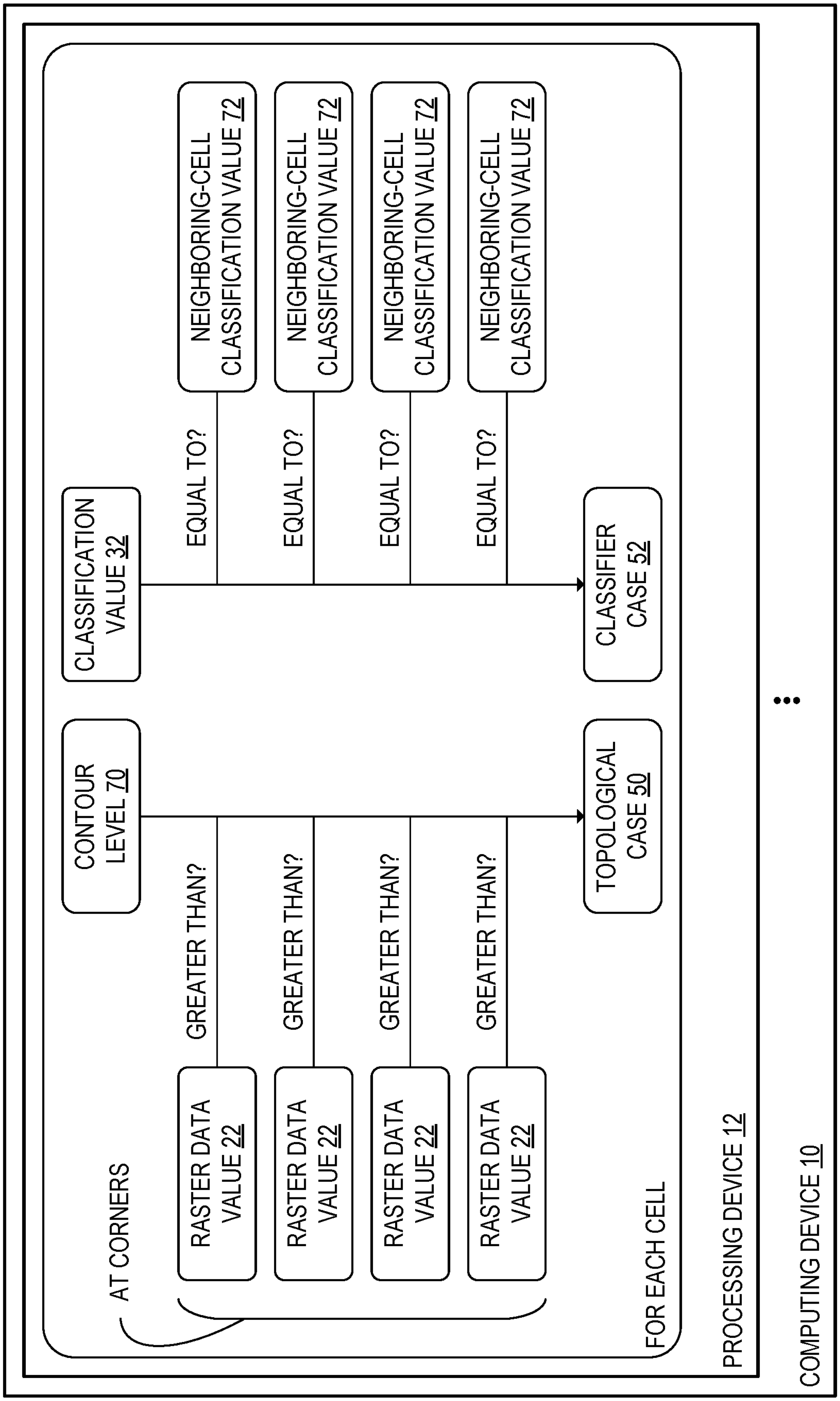
FIG. 5 schematically shows the computing device when the one or more processing devices compute topological cases and classifier cases for the cells, according to the example of FIG. 2.

Returning to the example of FIG. 2, generating the contour segment set 62 includes computing respective topological cases 50 of the cells 48 of the superimposed grid 46. The computation of a topological case 50 is shown in the example of FIG. 5. As shown in FIG. 5, each of the topological cases 50 indicates which (if any) of the raster data values 22 included in the cell 48 are greater than a current contour level 70. The value of the topological case 50 is determined for a given contour level 70 as follows. First, a topological case value is assigned to each of the corners of the cell 48. In some examples, the upper left corner has a topological case value of 1, the upper right corner has a topological case value of 2, the lower left corner has a topological case value of 4, and the lower right corner has a topological case value of 8. For each corner, if the raster data value 22 corresponding to that point is greater than the contour level 70, the one or more processing devices 12 are configured to add the topological case value for that corner to a sum for that cell 48 that specifies the topological case 50. The resulting topological case values are values between 0 (no raster data values 22 greater than the contour level 70) and 15 (all four raster data values 22 greater than the contour level 70) that each uniquely specify a respective topological case 50.

The one or more processing devices 12 are further configured to compute respective classifier cases 52 of the cells 48 of the superimposed grid 46. FIG. 5 further shows the computing device 10 of FIG. 2 in additional detail when the one or more processing devices 12 compute the classifier cases 52 of the cells 48, according to one example. For each of the cells 48 of the superimposed grid 46, the corresponding classifier case 52 indicates which of a plurality of neighboring-cell classification values 72 are equal to the classification value 32 of the cell 48. Accordingly, the classifier case 50 can be a set of four Boolean-valued flags associated with the cell 48.

Figure 6:
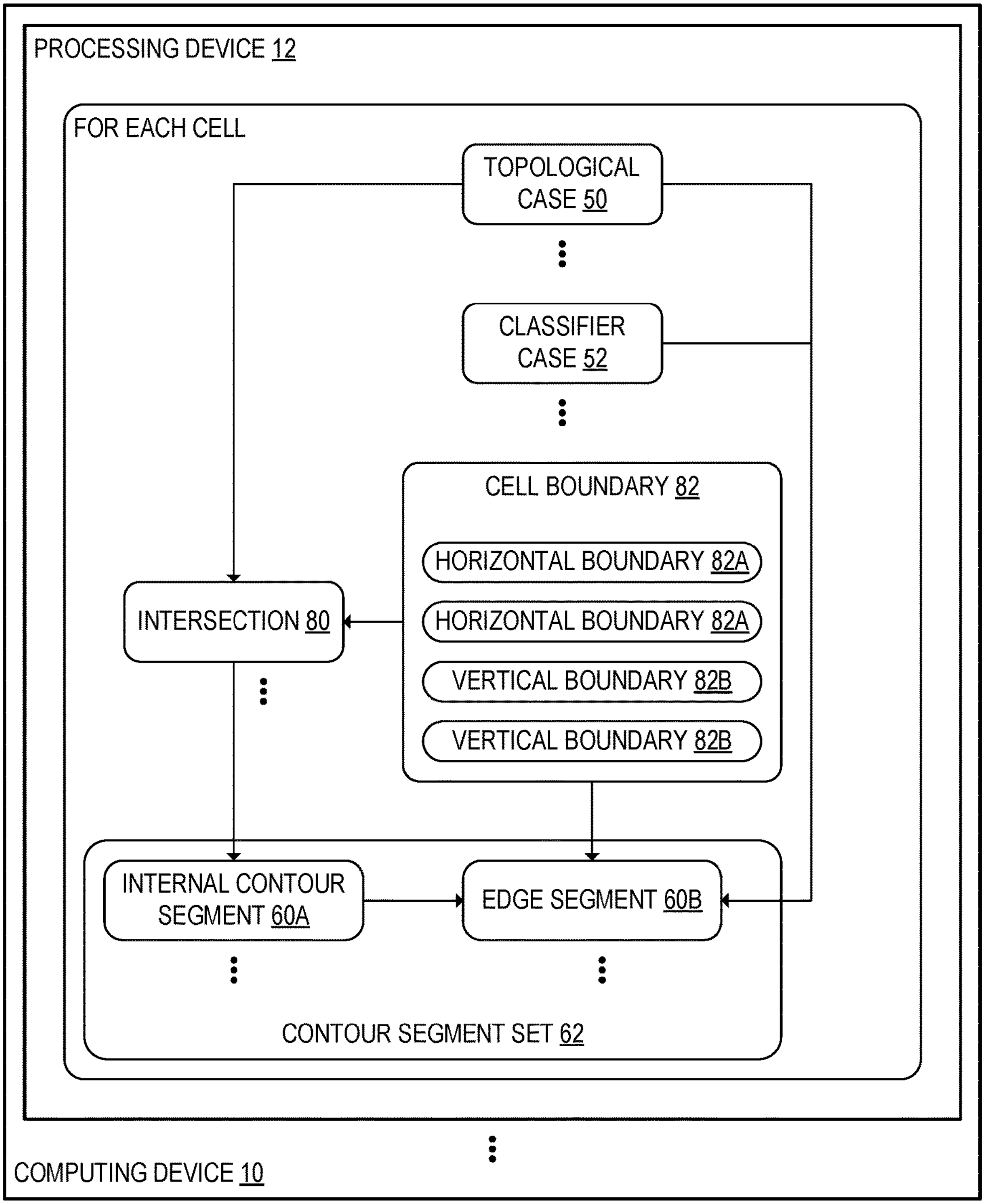
FIG. 6 schematically shows the computing device when the one or more processing devices compute contour segments, according to the example of FIG. 2.

FIG. 6 shows the computing device 10 in additional detail when the one or more processing devices 12 are configured to compute the contour segments 60. In the example of FIG. 6, the contour segment set 62 includes a plurality of internal contour segments 60A and a plurality of edge segments 60B. The internal contour segments 60A are located within respective cells 48 of the superimposed grid 46. The edge segments 60B are located along cell boundaries 82 of respective cells 48 of the superimposed grid 46. The cell boundaries 82 of a cell 48 include two horizontal boundaries 82A and two vertical boundaries 82B.

As shown in the example of FIG. 6, the one or more processing devices 12 are configured to compute a plurality of intersections 80 between respective contour segments 60 and the horizontal or vertical boundaries 82A or 82B of corresponding cells 48. These intersections occur at interpolated points located along the horizontal and vertical boundaries 82A and 82B.

In the following discussion of the intersections 80, a local coordinate system is defined in which the upper lefthand corner of the current cell 48A is indicated as (0, 0), the upper righthand corner is indicated as (0, 1), the lower lefthand corner is indicated as (1, 0), and the lower righthand corner is indicated as (1, 1). In this example, for the cells 48 other than the upper-leftmost cell 48 in the superimposed grid 46, the local coordinate system differs from the global coordinate system discussed above. These corners are labeled UL, UR, LL, and LR respectively. FIG. 4 further shows the locations of the points UL, UR, LL, and LR on the example current cell 48A.

Returning to the example of FIG. 6, the one or more processing devices 12 are further configured to compute the internal intersections 80 of contour segments 60A with cell boundaries 82 for each cell 48 based on the raster grid values at the corners UL, UR, LL, and LR of the cell. The interpolated Top point is defined as a point along the segment connecting points UL and UR, with its x coordinate determined as a value between 0 and 1 by interpolating the contour level 70 between the raster values UL and UR, and with its y coordinate equal to 0. The interpolated Bottom point is defined as a point along the segment connecting points LL and LR, with its x coordinate determined as a value between 0 and 1 by interpolating the contour level 70 between the raster values LL and LR, and with its y coordinate equal to 1. The interpolated Left point is defined as a point along the segment connecting points UL and LL, with its x coordinate equal to 0, and with its y coordinate determined as a value between 0 and 1 by interpolating the contour level 70 between the raster values UL and LL. The interpolated Right point is defined as a point along the segment connecting points UR and LR, with its x coordinate equal to 1, and with its y coordinate determined as a value between 0 and 1 by interpolating the contour level 70 between the raster values UR and LR. Examples of the points Top, Bottom, Left, and Right are also shown in the example of FIG. 4.

Returning to the example of FIG. 6, the one or more processing devices 12 are further configured to compute the internal contour segments 60A for each cell 48 based at least in part on the intersections 80 computed for that cell 48. In addition, the internal contour segments 60A are computed based at least in part on the topological cases 50. The one or more processing devices 12 are further configured to compute the plurality of edge segments 60B based at least in part on the topological cases 50 and the classifier cases 52. Pseudocode for the computation of the internal contour segments 60A and edge segments 60B in each topological case 50 is provided below:

Topological case 0: the cell has no internal contour segments.

Topological case 1: (upper left grid value greater than contour level)

add a contour segment from Top to Left
if leftNeighborDifferent, add a contour segment from Left to UL
if topNeighborDifferent, add a contour segment from UL to Top Topological case 2: (upper right grid value greater than contour level)

add a contour segment from Right to Top
if topNeighborDifferent, add a contour segment from Top to UR
if rightNeighborDifferent, add a contour segment from UR to Right Topological case 3: (upper left and upper right grid values greater than contour level)

add a contour segment from Right to Left
if leftNeighborDifferent, add a contour segment from Left to UL
if topNeighborDifferent, add a contour segment from UL to UR
if rightNeighborDifferent, add a contour segment from UR to Right Topological case 4: (lower left grid value greater than contour level)

add a contour segment from Left to Bottom
if bottomNeighborDifferent, add a contour segment from Bottom to LL
if leftNeighborDifferent, add a contour segment from LL to Left Topological case 5: (upper left and lower left grid values greater than contour level)

add a contour segment from Top to Bottom
if bottomNeighborDifferent, add a contour segment from Bottom to LL
if leftNeighborDifferent, add a contour segment from LL to UL
if topNeighborDifferent, add a contour segment from UL to Top Topological case 6: (upper right and lower left grid values greater than contour level). This is one of two "saddle cases," and there are two possible ways to create contours for this case: opposing corners can be connected or kept separate.

If the contours form a diagonal line across the cell:

add a contour segment from Left to Top
if topNeighborDifferent, add a contour segment from Top to UR
if rightNeighborDifferent, add a contour segment from UR to Right
add a contour segment from Right to Bottom
if bottomNeighborDifferent, add a contour segment from Bottom to LL
if leftNeighborDifferent, add a contour segment from LL to Left Otherwise, if contours at opposing corners are kept separate:

add a contour segment from Right to Top
if topNeighborDifferent, add a contour segment from Top to UR
if rightNeighborDifferent, add a contour segment from UR to Right Then, add a contour segment from Left to Bottom
if bottomNeighborDifferent, add a contour segment from Bottom to LL
if leftNeighborDifferent, add a contour segment from LL to Left Topological case 7: (upper left, upper right, and lower left grid values greater than contour level)

add a contour segment from Right to Bottom
if bottomNeighborDifferent, add a contour segment from Bottom to LL
if leftNeighborDifferent, add a contour segment from LL to UL
if topNeighborDifferent, add a contour segment from UL to UR
if rightNeighborDifferent, add a contour segment from UR to Right Topological case 8: (lower right grid value greater than contour level)

add a contour segment from Bottom to Right
if rightNeighborDifferent, add a contour segment from Right to LR
if bottomNeighborDifferent, add a contour segment from LR to Bottom Topological case 9: (upper left and lower right grid values greater than contour level). This is the other of two "saddle cases", and there are two possible ways to create contours for this case: opposing corners can be connected or kept separate.

If the contours form a diagonal line across the cell:

add a contour segment from Top to Right if rightNeighborDifferent, add a contour segment from Right to LR if bottomNeighborDifferent, add a contour segment from LR to Bottom add a contour segment from Bottom to Left if leftNeighborDifferent, add a contour segment from Left to UL if topNeighborDifferent, add a contour segment from UL to Top Otherwise, if contours at opposing corners are kept separate: add a contour segment from Top to Left if leftNeighborDifferent, add a contour segment from Left to UL if topNeighborDifferent, add a contour segment from UL to Top Then, add a contour segment from Bottom to Right if rightNeighborDifferent, add a contour segment from Right to LR if bottomNeighborDifferent, add a contour segment from LR to Bottom Topological case 10: (upper right and lower right grid values greater than contour level)

add a contour segment from Bottom to Top if topNeighborDifferent, add a contour segment from Top to UR if rightNeighborDifferent, add a contour segment from UR to LR if bottomNeighborDifferent, add a contour segment from LR to Bottom Topological case 11: (upper left, upper right, and lower right grid values greater than contour level)

add a contour segment from Bottom to Left if leftNeighborDifferent, add a contour segment from Left to UL if topNeighborDifferent, add a contour segment from UL to UR if rightNeighborDifferent, add a contour segment from UR to LR if bottomNeighborDifferent, add a contour segment from LR to Bottom Topological case 12: (lower left and lower right grid values greater than contour level)

add a contour segment from Left to Right if rightNeighborDifferent, add a contour segment from Right to LR if bottomNeighborDifferent, add a contour segment from LR to LL if leftNeighborDifferent, add a contour segment from LL to Left Topological case 13: (upper left, lower left, and lower right grid values greater than contour level)

add a contour segment from Top to Right if rightNeighborDifferent, add a contour segment from Right to LR if bottomNeighborDifferent, add a contour segment from LR to LL if leftNeighborDifferent, add a contour segment from LL to UL if topNeighborDifferent, add a contour segment from UL to Top Topological case 14: (upper right, lower left, and lower right grid values greater than contour level)

add a contour segment from Left to Top if topNeighborDifferent, add a contour segment from Top to UR if rightNeighborDifferent, add a contour segment from UR to LR if bottomNeighborDifferent, add a contour segment from LR to LL if leftNeighborDifferent, add a contour segment from LL to Left Topological case 15: (all four grid values greater than contour level)

if topNeighborDifferent, add a contour segment from UL to UR if rightNeighborDifferent, add a contour segment from UR to LR if bottomNeighborDifferent, add a contour segment from LR to LL if leftNeighborDifferent, add a contour segment from LL to UL By referring to the topological cases 50 and classifier cases 52 of each of the cells 48 in the superimposed grid 46 as described in the above pseudocode, the one or more processing devices 12 are configured to compute each of the contour segments 60 included in the contour segment set 62. This contour segment set 62 is specific to a contour level 70 of the plurality of contour levels 70, and to a class 36 of the plurality of classes 36 from among which the classification values 32 are selected. The one or more processing devices 12 are configured to compute respective contour segment sets 62 for each of the classes 36. For each unique combination of a contour level 70 and a class 36, the one or more processing devices 12 are configured to compute respective topological cases 50 and classifier cases 52 for the cells 48 of the superimposed grid 46 and are further configured to compute the contour segment set 62 for that class 36 based at least in part on the topological cases 50 and the classifier cases 52 using the techniques discussed above.

Returning to the example of FIG. 2, the one or more processing devices 12 are further configured to combine the contour segments 60 into a plurality of contours 64. The contour segments 60 are combined into the contours 64 by joining the contour segments 60 end-to-end. The one or more processing devices 12 are further configured to compute the contour map 66 as a visual representation of the plurality of contours 64.

Subsequently to computing the contour map 66, the one or more processing devices 12 are further configured to output the contour map 66 for display at a display device 18. The display device 18 can be located in the same physical computing device as the one or more processing devices 12 that are configured to compute the contour map 66 or can alternatively be located in another physical computing device. In some examples, the contour map 66 is computed at a server computing device and transmitted to client computing device that includes the display device 18.

Figure 7:
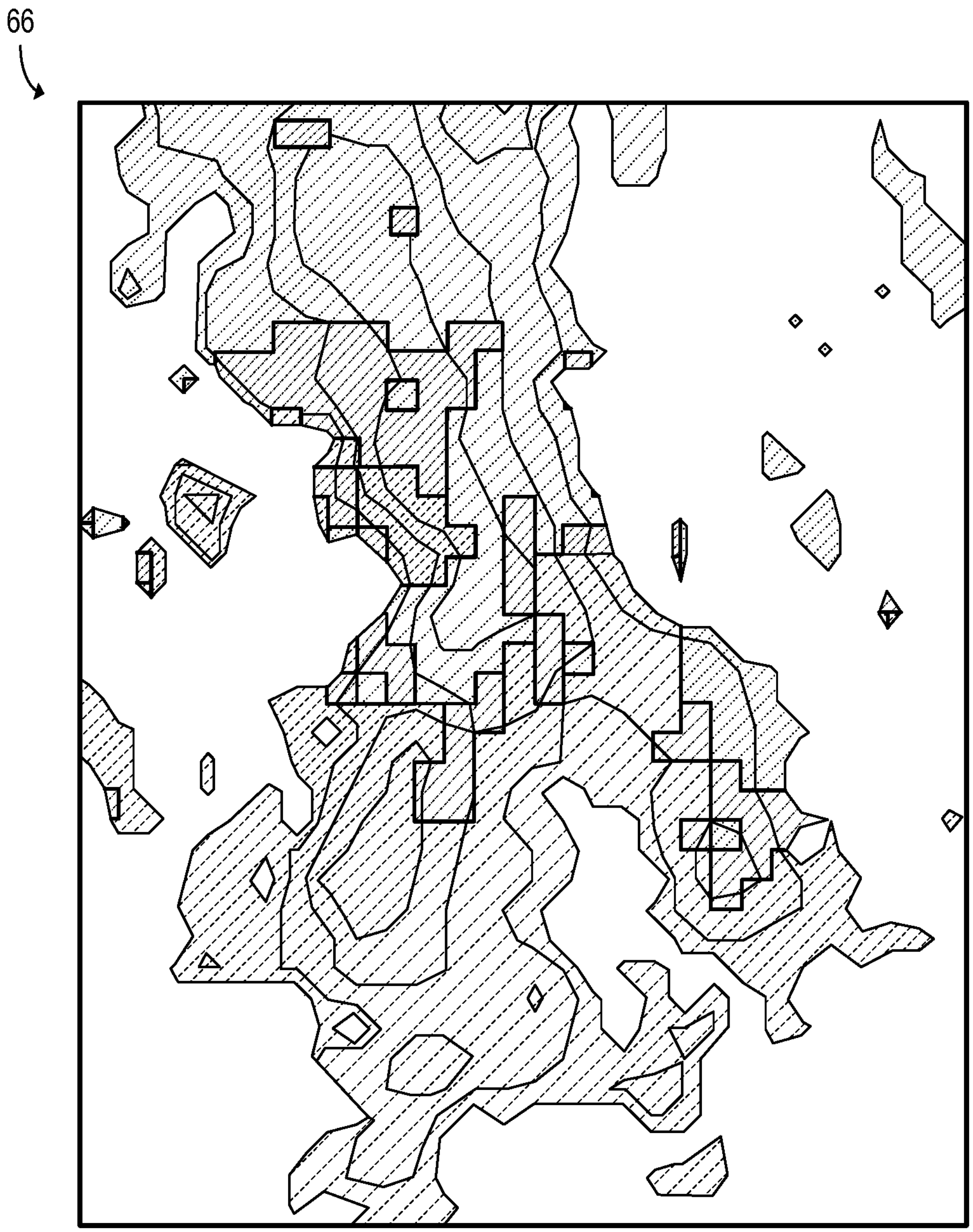
FIG. 7 shows an example contour map, according to the example of FIG. 1.

FIG. 7 shows an example contour map 66. The example contour map 66 of FIG. 7 is a weather map in which the classes 36 indicate precipitation type (snow, rain, or a snow-rain mix) and the contours 64 indicate precipitation quantity. The contour map 66 indicates the classes 36 associated with the contours 64 in a visually distinguishable manner by using different types of shading to indicate the different precipitation types (dotted for snow, dashed for rain, and alternating dots and dashes for a snow-rain mix).

The example contour map 66 also uses thick lines to indicate boundaries between regions that have different precipitation types.

In the example of FIG. 7, the contour map 66 visually represents the contours 64 as closed polygons. The plurality of closed polygons shown in FIG. 7 includes polygons that are closed within the interior of the contour map 66, as well as polygons that extend to the edge of the contour map 66 and accordingly form closed polygons with boundaries that include both the contour 64 and the map edge. In other examples, the contours 64 that intersect the map edge can be displayed as open contours instead. In some examples, the regions within the different contours 64 associated with a class 36 are displayed to have respective visually distinguishing features other than the contour lines, such as different shading or respective contour-level labels. Thus, the different classes 36 and the different contours 64 within those classes 36 are both represented in the contour map 66 in a visually distinguishable manner.

Figure 8A:
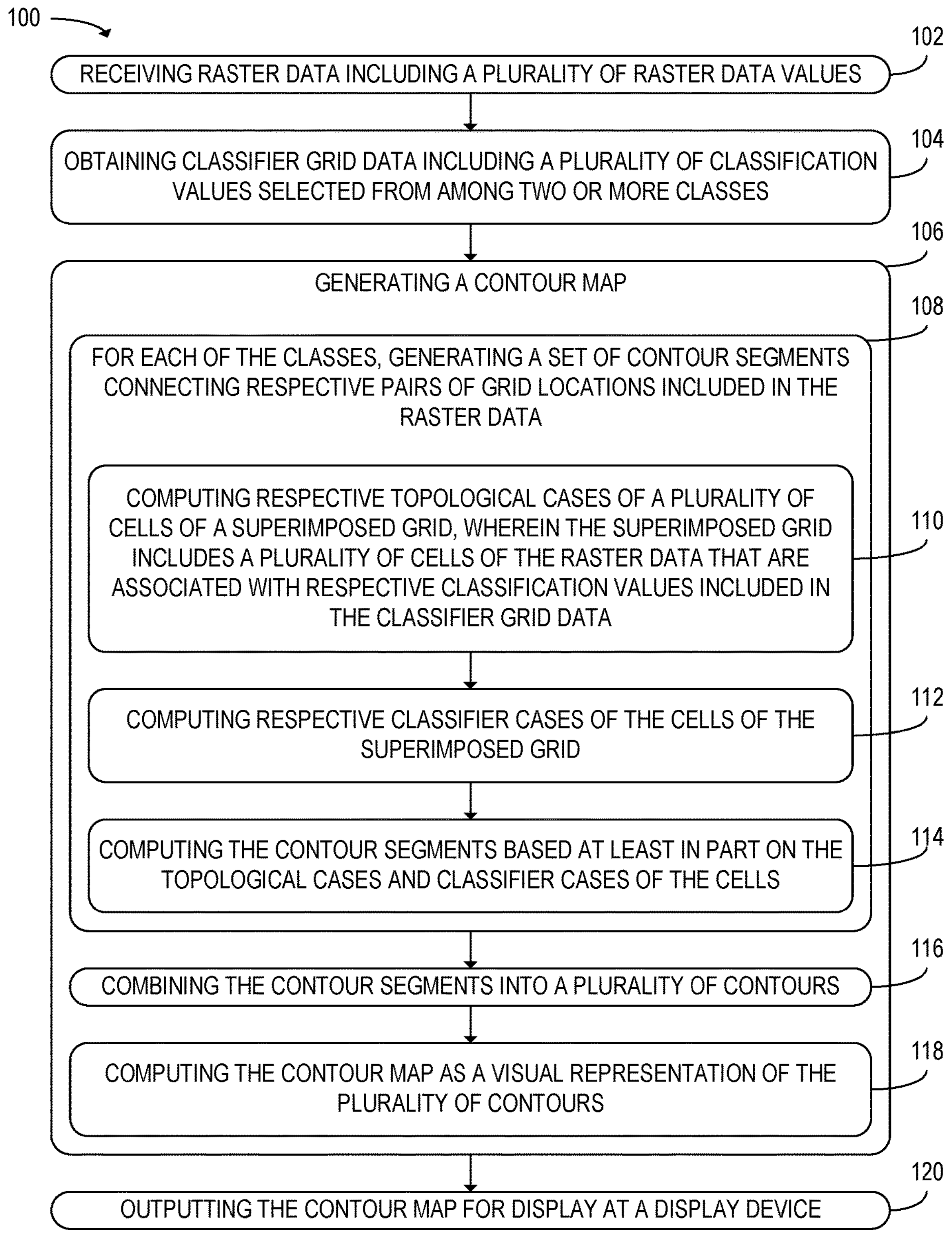
FIG. 8A shows a flowchart of a method for use with a computing device to generate and output a contour map according to the example of FIG. 1.

FIG. 8A shows a flowchart of a method 100 for use with a computing device to generate and output a contour map. The method 100 of FIG. 8A can be performed at the computing device 10 of FIG. 2. At step 102, the method 100 includes receiving raster data including a plurality of raster data values. The raster data values are each associated with a respective raster grid location. At step 104, the method 100 further includes obtaining classifier grid data including a plurality of classification values selected from among two or more classes. The classification values are associated with respective classification grid locations.

In some examples, the contour map generated with the method 100 is a weather map. In such examples, the raster data can be temperature data, precipitation quantity data, wind speed data, pressure data, humidity data, air quality data, pollen data, visibility data, dew point data, or wind chill data. In addition, the classifier grid data can precipitation type data, cloud cover data, or advisory data. Other types of weather data can also be used as the raster data or classifier grid data.

At step 106, the method 100 further includes generating a contour map. Steps 108, 110, 112, 114, 116, and 118 are performed when the contour map is generated at step 106. At step 108, for each of the classes from which the classification values are selected, generating the contour map includes generating a set of contour segments connecting respective pairs of grid locations included in the raster data.

In some examples, for each of the classes, two or more respective sets of contour segments can generated at step 108. The two or more sets of contour segments generated in such examples correspond to different contour levels of the raster data values. Accordingly, the contour segment sets are generated at corresponding iterations associated with buckets of the raster data values.

In some examples, one or more of the sets of contour segments can be empty. For example, a set of contour segments can be empty when there is no overlap between a given classifier class and the region where the raster data is at a minimum requested contour level. As another example, the contour set can be empty when the raster data includes no values greater than the minimum requested contour level, such as when the raster data indicates precipitation quantity data over a mapped area in which no precipitation occurs.

Generating the contour segments at step 108 includes, at step 110, computing respective topological cases of a plurality of cells of a superimposed grid. For each of the cells of the superimposed grid, the corresponding topological case indicates which of the raster data values included in the cell are greater than a current contour level for which the contour segments are generated in a current iteration.

The superimposed grid includes a plurality of cells of the raster data that are associated with respective classification values included in the classifier grid data. According to some examples, in the superimposed grid, the classifier grid data is offset from the raster data by half a pixel along both a horizontal axis and a vertical axis. In such examples, each of the cells of the superimposed grid is a 2×2 cell of raster data values, which are associated with classification values included in the classifier grid data. A padding value border is added to the classifier grid data in some examples prior to computing the superimposed grid. In examples in which the padding value border is added, the padding value border includes a plurality of classification values that differ from those of the two or more classes of the classifier grid data, thereby distinguishing the padding values from the other classification values.

At step 112, generating the contour segments at step 108 further includes computing respective classifier cases of the cells of the superimposed grid. For each of the cells of the superimposed grid, the corresponding classifier case indicates which of a plurality of neighboring-cell classification values are equal to the classification value of the cell. The neighboring-cell classification values are the classification values of the cells above, below, to the left of, and to the right of a current cell.

At step 114, step 108 further includes computing the contour segments based at least in part on the topological cases and classifier cases of the cells. As discussed below, computing the contour segments for a contour level includes computing internal contour segments and/or edge segments that indicate a boundary of the contour level.

At step 116, generating the contour map at step 106 further includes combining the contour segments into a plurality of contours. For each of the contour levels computed for each class, the contour segments included in the corresponding contour segment set computed at step 108 are combined by connecting the contour segments end-to-end.

At step 118, generating the contour map at step 106 further includes computing the contour map as a visual representation of the plurality of contours. In some examples, the contour map visually represents the contours as closed polygons. The contour map also indicates the two or more classes associated with the contours in a visually distinguishable manner. Thus, the different classes and the contour levels within those classes are both represented in the contour map.

At step 120, the method 100 further includes outputting the contour map for display at a display device. The display device can be included in the same computing device at which the contour map is computed. Alternatively, the display device can be included in a different computing device such as a client computing device.

Figure 8B:
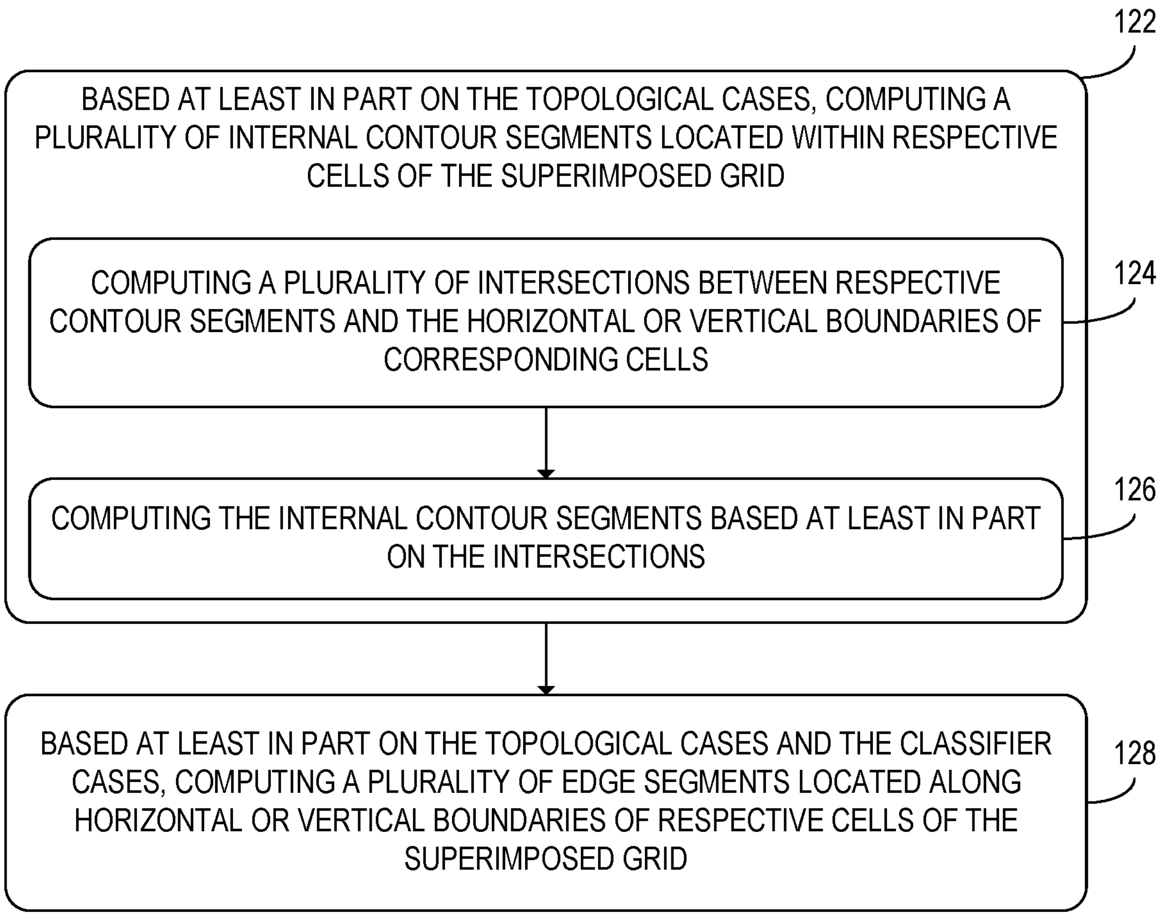
FIG. 8B shows additional steps of the method of FIG. 7A that are performed in some examples when generating contour segments.

FIG. 8B shows additional steps of the method 100 that are performed in some examples when generating the contour segments at step 108. At step 122, based at least in part on the topological cases, step 108 further includes computing a plurality of internal contour segments located within respective cells of the superimposed grid. In some examples, computing the internal contour segments at step 122 includes, at step 124, computing a plurality of intersections between respective contour segments and the horizontal or vertical boundaries of corresponding cells. In such examples, computing the internal contour segments further includes, at step 126, computing the internal contour segments based at least in part on the intersections.

In some examples, step 108 further includes, at step 128, computing a plurality of edge segments located along horizontal or vertical boundaries of respective cells of the superimposed grid. The edge segments are computed based at least in part on the topological cases and the classifier cases. Accordingly, for each of the classes, internal contour segments and/or edge segments are computed for each of the plurality of contour levels.

Using the devices and methods discussed above, a contour map representing raster data and classifier grid data is generated. The contour map is generated in a manner that avoids artifacts that occur when masking is used, such as gaps and ramps between the contours associated with different classes. In addition, the contour map is generated using techniques that are less computationally intensive than polygon clipping. Thus, the contour map is computed in a computationally efficient manner while preserving accuracy.

The methods and processes described herein are tied to a computing system of one or more computing devices. In particular, such methods and processes can be implemented as a computer-application program or service, an application-programming interface (API), a library, and/or other computer-program product.

Figure 9:
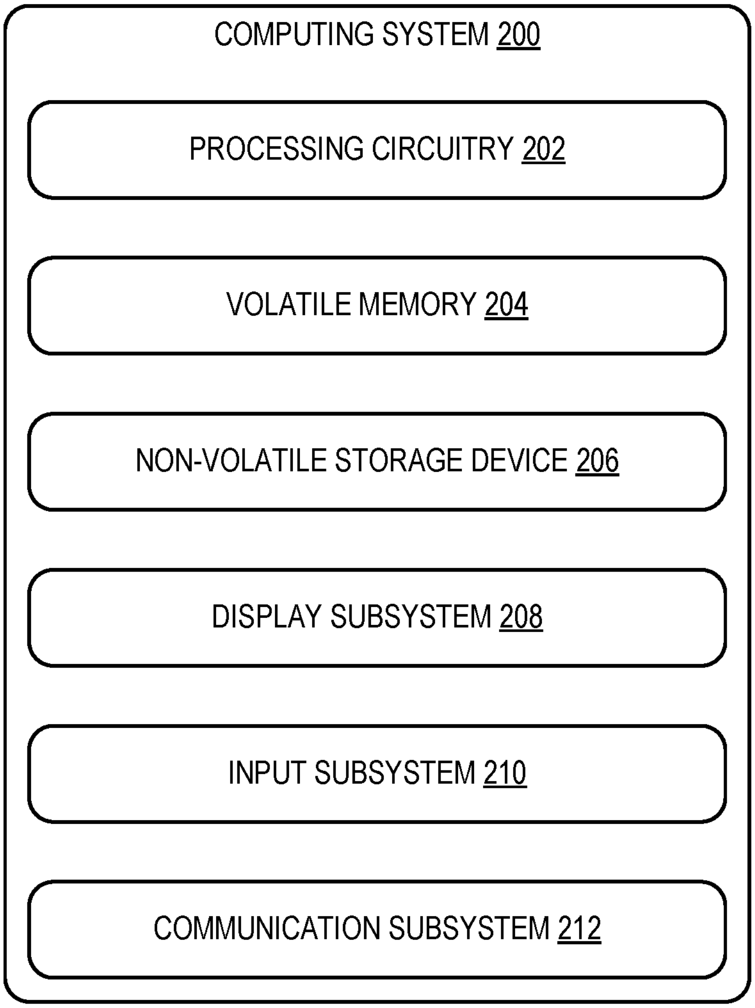
FIG. 9 shows a schematic view of an example computing environment in which the computing device of FIG. 2 can be instantiated.

FIG. 9 schematically shows a non-limiting embodiment of a computing system 200 that can enact one or more of the methods and processes described above. Computing system 200 is shown in simplified form. Computing system 200 can embody the computing device 10 described above and illustrated in FIG. 2. Components of computing system 200 can be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 200 includes a logic processor 202 volatile memory 204, and a non-volatile storage device 206. Computing system 200 can further include a display subsystem 208, input subsystem 210, communication subsystem 212, and/or other components not shown in FIG. 9.

Logic processor 202 includes one or more physical devices configured to execute instructions. For example, the logic processor can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor can include one or more physical processors configured to execute software instructions. Additionally or alternatively, the logic processor can include one or more hardware logic circuits or firmware devices configured to execute hardware-implemented logic or firmware instructions. Processors of the logic processor 202 can be single-core or multi-core, and the instructions executed thereon can be configured for sequential, parallel, and/or distributed processing. Individual components of the logic processor optionally can be distributed among two or more separate devices, which can be remotely located and/or configured for coordinated processing. Aspects of the logic processor can be virtualized and executed by remotely accessible, networked computing devices configured in a cloud-computing configuration. In such a case, these virtualized aspects are run on different physical logic processors of various different machines.

Non-volatile storage device 206 includes one or more physical devices configured to hold instructions executable by the logic processors to implement the methods and processes described herein. When such methods and processes are implemented, the state of non-volatile storage device 206 can be transformed—e.g., to hold different data.

Non-volatile storage device 206 can include physical devices that are removable and/or built in. Non-volatile storage device 206 can include optical memory, semiconductor memory, and/or magnetic memory, or other mass storage device technology. Non-volatile storage device 206 can include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 can include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 200 typically implemented in software by a processor to perform a particular function using portions of volatile memory, which function involves transformative processing that specially configures the processor to perform the function. Thus, a module, program, or engine can be instantiated via logic processor 202 executing instructions held by non-volatile storage device 206, using portions of volatile memory 204. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included, display subsystem 208 can be used to present a visual representation of data held by non-volatile storage device 206. The visual representation can take the form of a graphical user interface (GUI). As the herein described methods and processes change the data held by the non-volatile storage device, and thus transform the state of the non-volatile storage device, the state of display subsystem 208 can likewise be transformed to visually represent changes in the underlying data. Display subsystem 208 can include one or more display devices utilizing virtually any type of technology. Such display devices can be combined with logic processor 202, volatile memory 204, and/or non-volatile storage device 206 in a shared enclosure, or such display devices can be peripheral display devices.

When included, input subsystem 210 can comprise or interface with one or more user-input devices such as a keyboard, mouse, touch screen, camera, or microphone.

When included, communication subsystem 212 can be configured to communicatively couple various computing devices described herein with each other, and with other devices. Communication subsystem 212 can include wired and/or wireless communication devices compatible with one or more different communication protocols. As non-limiting examples, the communication subsystem can be configured for communication via a wired or wireless local- or wide-area network, broadband cellular network, etc. In some embodiments, the communication subsystem can allow computing system 200 to send and/or receive messages to and/or from other devices via a network such as the Internet.

Further, the disclosure comprises configurations according to the following clauses.

Clause 1. A computing device comprising: one or more processing devices configured to: receive raster data including a plurality of raster data values; obtain classifier grid data including a plurality of classification values selected from among two or more classes; generate a contour map at least in part by: for each of the classes, generating a set of contour segments connecting respective pairs of grid locations included in the raster data, wherein generating the set of contour segments includes: computing respective topological cases of a plurality of cells of a superimposed grid, wherein the superimposed grid includes a plurality of cells of the raster data that are associated with respective classification values included in the classifier grid data; computing respective classifier cases of the cells of the superimposed grid; and computing the contour segments based at least in part on the topological cases and classifier cases of the cells; combining the contour segments into a plurality of contours; and computing the contour map as a visual representation of the plurality of contours; and output the contour map for display at a display device.

Clause 2. The computing device according to Clause 1, wherein: in the superimposed grid, the classifier grid data is offset from the raster data by half a pixel along both a horizontal axis and a vertical axis; and each of the cells of the superimposed grid is a 2×2 cell of raster data values.

Clause 3. The computing device according to Clause 2, wherein: for each of the classes, the one or more processing devices are configured to generate two or more respective sets of contour segments; and the two or more sets of contour segments correspond to different contour levels of the raster data values.

Clause 4. The computing device according to Clause 3, wherein, for each of the cells of the superimposed grid, the corresponding topological case indicates which of the raster data values included in the cell are greater than a current contour level.

Clause 5. The computing device according to any of Clauses 2-4, wherein, for each of the cells of the superimposed grid, the corresponding classifier case indicates which of a plurality of neighboring-cell classification values are equal to the classification value of the cell.

Clause 6. The computing device of Clause 5, wherein the one or more processing devices are configured to compute the contour segments at least in part by: based at least in part on the topological cases, computing a plurality of internal contour segments located within respective cells of the superimposed grid; and based at least in part on the topological cases and the classifier cases, computing a plurality of edge segments located along horizontal or vertical boundaries of respective cells of the superimposed grid.

Clause 7. The computing device of Clause 6, wherein the one or more processing devices are further configured to: compute a plurality of intersections between respective contour segments and the horizontal or vertical boundaries of corresponding cells; and compute the internal contour segments based at least in part on the intersections.

Clause 8. The computing device of any of Clauses 2-7, wherein the one or more processing devices are further configured to add a padding value border to the classifier grid data prior to computing the superimposed grid.

Clause 9. The computing device of any of Clauses 1-8, wherein: the contour map visually represents the contours as closed polygons; and the contour map indicates the two or more classes associated with the contours in a visually distinguishable manner.

Clause 10. The computing device of any of Clauses 1-9, wherein: the contour map is a weather map; the raster data is temperature data, precipitation quantity data, wind speed data, pressure data, humidity data, air quality data, pollen data, visibility data, dew point data, or wind chill data; and the classifier grid data is precipitation type data, cloud cover data, or advisory data.

Clause 11. A method for use with a computing device, the method comprising: receiving raster data including a plurality of raster data values; obtaining classifier grid data including a plurality of classification values selected from among two or more classes; generating a contour map at least in part by: for each of the classes, generating a set of contour segments connecting respective pairs of grid locations included in the raster data, wherein generating the set of contour segments includes: computing respective topological cases of a plurality of cells of a superimposed grid, wherein the superimposed grid includes a plurality of cells of the raster data that are associated with respective classification values included in the classifier grid data; computing respective classifier cases of the cells of the superimposed grid; and computing the contour segments based at least in part on the topological cases and classifier cases of the cells; combining the contour segments into a plurality of contours; and computing the contour map as a visual representation of the plurality of contours; and outputting the contour map for display at a display device.

Clause 12. The method according to Clause 11, wherein: in the superimposed grid, the classifier grid data is offset from the raster data by half a pixel along both a horizontal axis and a vertical axis; and each of the cells of the superimposed grid is a 2×2 cell of raster data values.

Clause 13. The method according to Clause 12, further comprising, for each of the classes, generating two or more respective sets of contour segments, wherein the two or more sets of contour segments correspond to different contour levels of the raster data values.

Clause 14. The method according to Clause 13, wherein, for each of the cells of the superimposed grid, the corresponding topological case indicates which of the raster data values included in the cell are greater than a current contour level.

Clause 15. The method according to any of Clauses 12-14, wherein, for each of the cells of the superimposed grid, the corresponding classifier case indicates which of a plurality of neighboring-cell classification values are equal to the classification value of the cell.

Clause 16. The method according to Clause 15, wherein computing the contour segments includes: based at least in part on the topological cases, computing a plurality of internal contour segments located within respective cells of the superimposed grid; and based at least in part on the topological cases and the classifier cases, computing a plurality of edge segments located along horizontal or vertical boundaries of respective cells of the superimposed grid.

Clause 17. The method according to Clause 16, further comprising: computing a plurality of intersections between respective contour segments and the horizontal or vertical boundaries of corresponding cells; and computing the internal contour segments based at least in part on the intersections.

Clause 18. The method according to any of Clauses 12-17, further comprising adding a padding value border to the classifier grid data prior to computing the superimposed grid.

Clause 19. The method according to any of Clauses 11-18, wherein: the contour map visually represents the contours as closed polygons; and the contour map indicates the two or more classes associated with the contours in a visually distinguishable manner.

Clause 20. A computing device comprising: one or more processing devices configured to: receive raster data including a plurality of raster data values; obtain classifier grid data including a plurality of classification values selected from among two or more classes; add a padding value border to the classifier grid data prior to computing the superimposed grid; generate a contour map at least in part by: computing a superimposed grid in which the classifier grid data is offset from the raster data by half a pixel along both a horizontal axis and a vertical axis, wherein: the superimposed grid includes a plurality of cells of the raster data that are associated with respective classification values included in the classifier grid data; and each of the cells of the superimposed grid is a 2×2 cell of raster data values; for each of the classes, generating a set of contour segments connecting respective pairs of grid locations included in the raster data, wherein generating the set of contour segments includes: computing respective topological cases of a plurality of cells of the superimposed grid; computing respective classifier cases of the cells of the superimposed grid at least in part by, for each of the cells, computing which of a plurality of neighboring-cell classification values are equal to the classification value of the cell; and computing the contour segments based at least in part on the topological cases and classifier cases of the cells; combining the contour segments into a plurality of contours; and computing the contour map as a visual representation of the plurality of contours; and output the contour map for display at a display device.

"And/or" as used herein is defined as the inclusive or V, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:

one or more processing devices configured to:

receive raster data including a plurality of raster data values;

obtain classifier grid data including a plurality of classification values selected from among two or more classes;

generate a contour map at least in part by:

for each of the classes, generating a set of contour segments connecting respective pairs of grid locations included in the raster data, wherein generating the set of contour segments includes:

computing respective topological cases of a plurality of cells of a superimposed grid, wherein; the superimposed grid includes a plurality of cells of the raster data that are associated with respective classification values included in the classifier grid data; and for each of the cells of the superimposed grid, the corresponding topological case indicates which of the raster data values included in the cell are greater than a current contour level;

computing respective classifier cases of the cells of the superimposed grid, wherein, for each of the cells of the superimposed grid, the corresponding classifier case includes four Boolean flags that indicate which of four neighboring-cell classification values are equal to the classification value of the cell; and computing the contour segments based at least in part on the topological cases and classifier cases of the cells;

combining the contour segments into a plurality of contours; and computing the contour map as a visual representation of the plurality of contours; and output the contour map for display at a display device.

2. The computing device of claim 1, wherein:

in the superimposed grid, the classifier grid data is offset from the raster data by half a pixel along both a horizontal axis and a vertical axis; and each of the cells of the superimposed grid has a height of two raster data values and a width of two raster data values.

3. The computing device of claim 2, wherein:

for each of the classes, the one or more processing devices are configured to generate two or more respective sets of contour segments; and the two or more sets of contour segments correspond to different contour levels of the raster data values.

4. The computing device of claim 2, wherein:

the one or more processing devices are further configured to add a padding value border to the classifier grid data prior to computing the superimposed grid; and the padding value border includes a plurality of padding classification values that are distinct from the two or more classes.

5. The computing device of claim 1, wherein the one or more processing devices are configured to compute the contour segments at least in part by:

based at least in part on the topological cases, computing a plurality of internal contour segments located within respective cells of the superimposed grid; and based at least in part on the topological cases and the classifier cases, computing a plurality of edge segments located along horizontal or vertical boundaries of respective cells of the superimposed grid.

6. The computing device of claim 5, wherein the one or more processing devices are further configured to:

compute a plurality of intersections between respective contour segments and the horizontal or vertical boundaries of corresponding cells; and compute the internal contour segments based at least in part on the intersections.

7. The computing device of claim 1, wherein:

the contour map visually represents the contours as closed polygons; and the contour map indicates the two or more classes associated with the contours in a visually distinguishable manner.

8. The computing device of claim 1, wherein:

the contour map is a weather map;

the raster data is temperature data, precipitation quantity data, wind speed data, pressure data, humidity data, air quality data, pollen data, visibility data, dew point data, or wind chill data; and the classifier grid data is precipitation type data, cloud cover data, or advisory data.

9. A method for use with a computing device, the method comprising:

receiving raster data including a plurality of raster data values;

obtaining classifier grid data including a plurality of classification values selected from among two or more classes;

generating a contour map at least in part by:

for each of the classes, generating a set of contour segments connecting respective pairs of grid locations included in the raster data, wherein generating the set of contour segments includes:

computing respective topological cases of a plurality of cells of a superimposed grid, wherein:

the superimposed grid includes a plurality of cells of the raster data that are associated with respective classification values included in the classifier grid data; and for each of the cells of the superimposed grid, the corresponding topological case indicates which of the raster data values included in the cell are greater than a current contour level;

computing respective classifier cases of the cells of the superimposed grid, wherein, for each of the cells of the superimposed grid, the corresponding classifier case includes four Boolean flags that indicate which of four neighboring-cell classification values are equal to the classification value of the cell; and computing the contour segments based at least in part on the topological cases and classifier cases of the cells;

combining the contour segments into a plurality of contours; and computing the contour map as a visual representation of the plurality of contours; and outputting the contour map for display at a display device.

10. The method of claim 9, wherein:

in the superimposed grid, the classifier grid data is offset from the raster data by half a pixel along both a horizontal axis and a vertical axis; and each of the cells of the superimposed grid has a height of two raster data values and a width of two raster data values.

11. The method of claim 10, further comprising, for each of the classes, generating two or more respective sets of contour segments, wherein the two or more sets of contour segments correspond to different contour levels of the raster data values.

12. The method of claim 10, further comprising adding a padding value border to the classifier grid data prior to computing the superimposed grid, wherein the padding value border includes a plurality of padding classification values that are distinct from the two or more classes.

13. The method of claim 9, wherein computing the contour segments includes:

based at least in part on the topological cases, computing a plurality of internal contour segments located within respective cells of the superimposed grid; and based at least in part on the topological cases and the classifier cases, computing a plurality of edge segments located along horizontal or vertical boundaries of respective cells of the superimposed grid.

14. The method of claim 13, further comprising:

computing a plurality of intersections between respective contour segments and the horizontal or vertical boundaries of corresponding cells; and computing the internal contour segments based at least in part on the intersections.

15. The method of claim 9, wherein:

the contour map visually represents the contours as closed polygons; and the contour map indicates the two or more classes associated with the contours in a visually distinguishable manner.

16. A computing device comprising:

one or more processing devices configured to:

receive raster data including a plurality of raster data values;

obtain classifier grid data including a plurality of classification values selected from among two or more classes;

add a padding value border to the classifier grid data;

generate a contour map at least in part by:

computing a superimposed grid in which the classifier grid data is offset from the raster data by half a pixel along both a horizontal axis and a vertical axis, wherein:

the superimposed grid includes a plurality of cells of the raster data that are associated with respective classification values included in the classifier grid data; and each of the cells of the superimposed grid has a height of two raster data values and a width of two raster data values;

for each of the classes, generating a set of contour segments connecting respective pairs of grid locations included in the raster data, wherein generating the set of contour segments includes:

computing respective topological cases of a plurality of cells of the superimposed grid, wherein, for each of the cells of the superimposed grid, the corresponding topological case indicates which of the raster data values included in the cell are greater than a current contour level;

computing respective classifier cases of the cells of the superimposed grid wherein, for each of the cells, the corresponding classifier case includes four Boolean flags that indicate which of four neighboring-cell classification values are equal to the classification value of the cell; and computing the contour segments based at least in part on the topological cases and classifier cases of the cells;

combining the contour segments into a plurality of contours; and computing the contour map as a visual representation of the plurality of contours; and output the contour map for display at a display device.

17. The computing device of claim 16, wherein:

for each of the classes, the one or more processing devices are configured to generate two or more respective sets of contour segments; and the two or more sets of contour segments correspond to different contour levels of the raster data values.

18. The computing device of claim 16, wherein the one or more processing devices are configured to compute the contour segments at least in part by:

based at least in part on the topological cases, computing a plurality of internal contour segments located within respective cells of the superimposed grid; and based at least in part on the topological cases and the classifier cases, computing a plurality of edge segments located along horizontal or vertical boundaries of respective cells of the superimposed grid.

19. The computing device of claim 18, wherein the one or more processing devices are further configured to:

compute a plurality of intersections between respective contour segments and the horizontal or vertical boundaries of corresponding cells; and compute the internal contour segments based at least in part on the intersections.

20. The computing device of claim 16, wherein:

the contour map visually represents the contours as closed polygons; and the contour map indicates the two or more classes associated with the contours in a visually distinguishable manner.

* * * * *